Oct. 14, 1958  R. E. ANDERSON  2,856,582
METHOD AND APPARATUS FOR MEASURING THICKNESS
Filed May 24, 1955
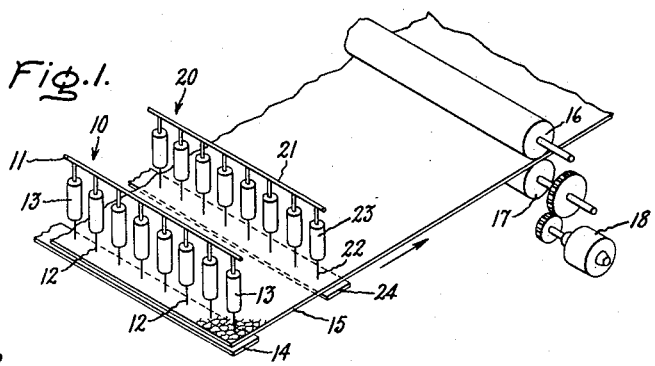
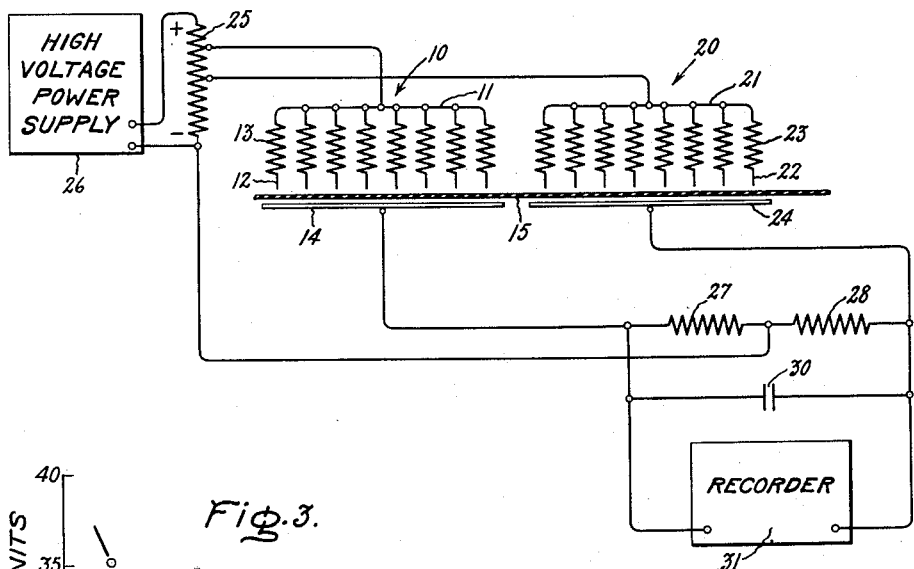
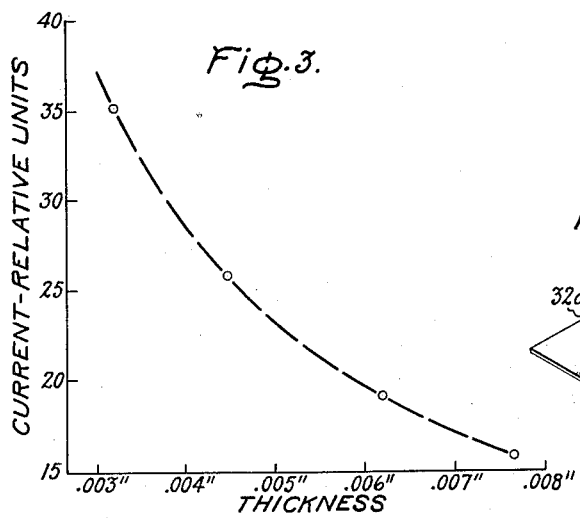
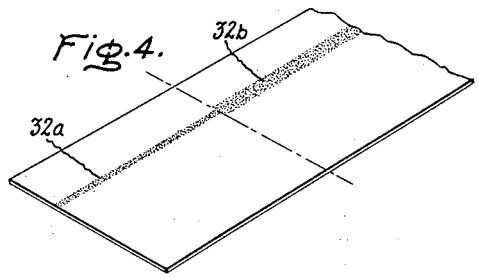
Inventor:
Roy E. Anderson,
by Merton D. Morse
His Attorney.

United States Patent Office 2,856,582
Patented Oct. 14, 1958

2,856,582

METHOD AND APPARATUS FOR MEASURING THICKNESS

Roy E. Anderson, Schenectady, N. Y., assignor to General Electric Company, a corporation of New York Application May 24, 1955, Serial No. 510,743

4 Claims. (Cl. 324—61)

This invention relates to thickness measurement and, more particularly, to a method and apparatus for measuring thickness of an insulating material.

In the processing of insulating material, such, for example, as sheets or strips of mica or the like, it is often desirable to measure the thickness of the material as it proceeds past a control or check point. The method and apparatus for making the measurement must fulfill several conditions to be completely successful. For example, it is desirable that the measurement be made without damaging the delicate insulating material in any way, and that a continuous measurement of average thickness across the sheet of material be provided. It is particularly desirable that the thickness measurement be substantially independent of the speed at which the material moves past the measuring apparatus.

An object of the present invention is to provide a method and apparatus for continuously measuring in a nondestructive manner the thickness of a moving sheet or web of insulating material which may be adapted to provide a continuous indication of the average thickness of the insulating material across the width of the sheet or web.

Another object is to provide a method and apparatus for measuring the thickness of a moving sheet of insulating material in which the thickness measurement is relatively independent of the speed of movement of the material.

According to the invention, a line of electric charges is placed on the insulating material by moving the material past a charging electrode. The current flowing through the charging electrode is directly related to and may be used as a measure of the thickness of the insulating material. If desired, a plurality of lines of charges may be placed across the width of the material, in which case the total charging current indicates the average thickness across the material. When the charges are placed in one or more lines along the material, with uncharged areas between the lines, the charging current is substantially independent of the speed at which the material is moving past the charging electrode or electrodes.

One embodiment of the apparatus of the invention comprises a pointed electrode disposed near one surface of the insulating material and a conductive member located on the other side of the material. A unidirectional potential is provided between the pointed electrode and the conducting member such that a corona discharge takes place therebetween when the insulating material is removed but which is insufficient to break down even thinnest sheets of insulating material. As the material moves between the pointed electrode and the conductive member, a line of electric charges are placed on the material. Means are provided to measure the charging current which is related to the thickness of the insulating material.

Because the potential existing between the charging electrode and the conductive member causes a discharge in the absence of insulating material therebetween current also flows through the electrode and the conductive member when a break or a void in the insulating member passes therebetween. Therefore, the apparatus may also comprise a second pointed electrode and conductive member spaced from the first electrode in the direction of movement of the insulating material. Current flows through the second electrode and conductive member only when a void or break appears in the insulating material passing therebetween. That current may be subtracted from the current flowing through the first electrode to provide a difference current that varies with the thickness of the insulating material and is insensitive to voids therein.

The novel features which are believed to be characteristic of the invention are set forth with particularity in the appended claims. The invention itself, however, both as to its organization and advantages thereof, may best be understood by reference to the following description taken in conjunction with the accompanying drawing, in which:

Fig. 1 is a perspective view of a portion of an apparatus for practicing the method of the invention;

Fig. 2 is a schematic circuit diagram of the apparatus;

Fig. 3 is a graph illustrating the current versus thickness characteristics of the apparatus; and Fig. 4 is a diagrammatic perspective view of an insulating material illustrating the charge pattern laid down thereon during the thickness measurement.

Referring to Fig. 1, the apparatus there shown includes a first electrode structure 10, which comprises a conductor 11 and a plurality of downwardly projecting electrodes 12, each connected to the conductor 11 through a respective resistance 13. Cooperating with the elongated probe-like electrodes 12 is a conductive member 14 longitudinally aligned with the pointed electrodes and spaced from the tips thereof. The insulating material, such as a strip of mica tape 15 whose thickness is to be measured, is interposed between the tips of the pointed electrodes 12 and the conductive member 14 with its lower surface in contact with the member 14 and its upper surface spaced from the tips of the electrodes 12. The apparatus is illustrated as including a pair of rollers 16 and 17 driven by a motor 18 for moving the strip or web of insulating material past the measuring apparatus. Of course, the material may be moved by other means depending on the specific application of the invention.

Adjacent to the electrode structure 10 and behind it in the direction of movement of the insulating material 15 is a second electrode structure 20 comprising a conductor 21 and a plurality of pointed electrodes 22, each connected to the conductor 21 through a respective resistor 23. Cooperating with the pointed electrodes 22 is an electrically conductive member 24 spaced from the tips of the electrodes 22 and longitudinally aligned therewith. The electrodes 22 are equal in number to and are aligned with the electrodes 12 so that the same areas of the insulating material 15 pass beneath corresponding electrodes of the structures 10 and 20. The material whose thickness is to be measured has one surface in contact with the conductive member 24 and its other surface spaced from the tips of the electrodes 22. It is pointed out that the electrode structures 10 and 20 are structurally similar and the material 15 whose thickness is to be measured is in the same position relative to each of the two electrode structures.

Referring now to Fig. 2, it is seen that the pointed electrodes 12 of the first electrode structure 10 are supplied through their respective resistors 13 and conductor 11 with a positive potential taken from a voltage divider 25 connected across the output of a conventional high voltage power supply 26. The cooperating conductive member 14 is connected through a resistance 27 to the negative potential end of the voltage divider 25 so that a unidirectional voltage appears across the gap between the tips of the pointed electrodes 12 and the conductive member 14. The potential across the gap is such that a corona discharge appears thereacross in the absence of an insulating material therein but is of insufficient magnitude to break down even a very thin insulating material located in the gap. The resistors 13 are of relatively large ohmic value and serve to limit the current flowing through any one electrode, thus preventing any substantial drop in the potential applied to the remaining electrodes.

The pointed electrodes 22 of the electrode structure are also connected through their respective resistances 23 and conductor 21 to a positive potential point in the voltage divider 25, and the cooperating conductive member 24 is connected through a resistance 28 to the negative potential end of the voltage divider. The potential across the gap between the electrodes 22 and the conductive member 24 is determined by the same requirements as is the potential across the gap between the electrodes 12 and the conductive member 14, as previously explained.

The method and apparatus of the present invention are based upon the fact that an insulating material, when passed through a gap across which appears a relatively high unidirectional potential, is electrically charged in accordance with the dielectric constant and the thickness of the insulating material. In the present case, it may be assumed that the dielectric constant remains fixed for a given insulating material, and hence the amount of charge placed on the insulating material is a function of the thickness of the material. As the insulating material 15 advances past the first electrode structure 10, electric charges are placed in a line along the insulating material by each of the pointed electrodes 12. This action causes a current, hereafter referred to as the "charging current," to flow through the circuit including the conductor 11, resistors 13, pointed electrodes 12, conductive member 14, and resistance 27. Thus, a unidirectional potential is developed across the resistance 27, with the value of the potential being related to the thickness of the insulating material 15 on which the electric charges are placed.

It is apparent to one skilled in the art that if the insulating material 15 has breaks or voids therein, current, in addition to the charging current, will flow through the circuit of the charging electrode structure 10. This occurs because the voltage necessary to charge the insulating material is such that a corona discharge appears between the pointed electrodes 12 and the conductive member 14 when no insulating material is interposed therebetween, as is the case when there are voids in the insulating material. That current, hereafter referred to as the "void current," could effectively mask the charging current so that the potential developed across the resistance 27 would at best be of uncertain significance. In order to cancel the effect of the void current, the second or void detecting electrode structure 20 is provided. Because the areas of the insulating material interposed between the tips of the pointed electrodes 22 and the conductive member 23 have been previously charged by the electrode structure 10, only an insignificant amount of current flows through the circuit of electrode structure 20 due to further charging of the insulating material. However, when a void appears in the gap of the electrode structure 20, void current flows therethrough. That current flowing through resistance 28 produces a potential drop thereacross which is equal to the potential developed across resistance 27 due to the void current in the charging electrode structure when those same voids appeared in the gap of the charging electrode structure.

The resistances 27 and 28 are so connected that the potentials developed thereacross are of opposite polarity, and hence the potential appearing across both resistances is equal to the difference between the potentials appearing across the individual resistances. That difference potential, which is related to the charging current only, is smoothed by a relatively large capacitor 30 connected across the two resistances 27 and 28, and may be utilized to actuate a conventional recorder 31 to provide a permanent record of the insulating material thickness. Alternatively, the recorder 31 may be replaced by a conventional voltmeter to provide an immediate visual indication of the thickness of the insulating material if a permanent record is not required. In some applications, the unidirectional potential developed across the resistances 27 and 28 may be utilized to control other apparatus (not shown) in a manufacturing process.

Fig. 3 is a graph having charging current in relative units as the ordinate, and thickness of a mica insulating material as abscissa. It is seen from the graph that the plot of charging current versus thickness is similar to a hyperbola. The general hyperbolic shape of the curve is in agreement with theory, for the charging current through the electrodes 12 varies directly with the capacitance between the electrodes 12 and the cooperating conductive member 14. The capacitance varies inversely with the thickness of the insulating material under test, and hence the charging current varies inversely as the thickness of the insulating material.

One of the outstanding advantages of the method and apparatus of the present invention is that the measurement of thickness is essentially independent of the speed at which the insulating material is moving past the measuring apparatus. The theory that accounts for this action is not completely understood at the present time. However, the electric charges are believed to exist on the insulating material in relatively narrow lines, one under each pointed electrode 12. Each line may be considered to be made up of a large number of very small areas, each of which is a small capacitor with a charging time constant so short that it is charged to a definite value during the time it is under the influence of an electrode. When one area is charged, the entire charging current through the electrode then flows to an adjacent area, and at any given thickness the number of areas charged per unit time is constant. Thus, the width of the charged line is a function of the speed at which the material moves past the charging electrode. If the material moves rapidly, the charged line is narrow; and if the material moves slowly, the charged line is wide. It is pointed out that the line of charged areas may not be continuous but may consist of many discreet charged areas which all together form a somewhat diffused line. So long as the material moves fast enough that the entire surface of the material is not charged, the charging current is substantially independent of the speed of movement of the material.

Fig. 4 illustrates diagrammatically the charging pattern on a strip of insulating material that has been moved past the charging electrode structure 10 at two different rates of speed. When the material was moved at a relatively fast rate, a narrow line of electric charges 32a is formed thereon; when the material is moved at a relatively slow rate of speed, a line 32b of charges is formed that is considerably wider than the line 32a. It has been found that the width of the line of charges varies approximately linearly with the speed of movement of the insulating material.

It is pointed out that were the charges to be applied to the insulating material by means of a single electrode extending the width of the material, the charging current would not be independent of the speed of movement of the material. This follows because substantially the entire surface of the material would be charged as the material passes beneath the charging electrode, and there would be no possibility of producing a charge pattern such as that shown in Fig. 4.

The apparatus has been illustrated as comprising plurality of charging electrodes distributed across the width of the material whose thickness is to be measured. It is pointed out, however, that the invention is not limited to that construction but may comprise only a single charging electrode rather than a plurality. The advantage of using a plurality of charging electrodes is that the average thickness of the material may be measured rather than just the thickness at a particular line extending along the material. In the case of many insulating materials, the average thickness measurement is of considerably greater value than is a single thickness measurement.

It is also pointed out that if the material being measured has no voids or breaks therein, the second or void detecting electrode structure 20 may be eliminated because no void current will flow through the charging electrode structure 10. Thus, the potential developed across the resistance 27 will be due to charging current only and will be indicative of the thickness of the insulating material being measured.

Although a particular embodiment of the invention has been illustrated, it is understood that the invention is not limited thereto since various modifications may be made both in the method and apparatus, and it is contemplated by the appended claims to cover any such modifications as fall within the true spirit and scope of the invention.

What I claim as new and desire to secure by Letters Patent of the United States is:

1. A method of indicating thickness of an insulating material, which comprises moving said material under a charging electrode through which current flows to place a line of electric charges on said material, and measuring the difference between the total current flowing through said electrode and the current flowing through said electrode because of voids in said material.

2. A method of indicating thickness of an insulating material, which comprises moving said material under a charging electrode through which current flows to place a line of electric charges on said material, moving said material under a detecting electrode through which current flows in the absence of material thereunder, said detecting electrode being spaced from said charging electrode in the direction of movement of said material and longitudinally aligned with said charging electrode, and measuring the difference in the current flowing through said charging electrode and said detecting electrode.

3. Apparatus for indicating thickness of a moving insulating material comprising a first probe-like electrode and a first conductive member arranged on opposite sides of said insulating material, said first electrode and said conductive member being arranged for connection to a source of potential for placing electric charges on said material and for electrically discharging therebetween in the absence of insulating material therebetween, a second probe-like electrode and a second conductive member adjacent to said first electrode and first conductive member and arranged on opposite sides of said insulating material, said second electrode and said second conductive member being arranged for connection to a source of potential for electrically discharging therebetween in the absence of insulating material therebetween, said second electrode being aligned with said first electrode whereby the same areas of said insulating material pass beneath both said electrodes, and means for measuring the difference in current flow through said first and second electrodes.

4. Apparatus for indicating thickness of a moving insulating material comprising a first plurality of probe-like electrodes spaced across the width of said material, a first conductive member, said first plurality of electrodes and said first conductive member being arranged on opposite sides of said insulating material for connection to a source of potential for placing electric charges on said material and for electrically discharging therebetween in the absence of insulating material therebetween, a second plurality of probe-like electrodes adjacent to said first plurality of electrodes and spaced across the width of said material, a second conductive member, said second plurality of electrodes and second conductive member being arranged on opposite sides of said insulating material for connection to a source of potential for electrically discharging therebetween in the absence of insulating material therebetween, said second plurality of electrodes being aligned with said first plurality of electrodes whereby the same areas of said insulating material pass beneath corresponding ones of both said pluralities of electrodes, and means for measuring the difference in current flow through said first and second pluralities of electrodes.

References Cited in the file of this patent

UNITED STATES PATENTS

| | | |
|---|---|---|
| 2,220,489 | Lowkrantz | Nov. 5, 1940 |
| 2,503,224 | Trump et al. | Apr. 4, 1950 |
| 2,532,010 | Courvoisier | Nov. 28, 1950 |
| 2,697,793 | Trump et al. | Dec. 21, 1954 |
| 2,701,336 | Anderson | Feb. 1, 1955 |